(12) United States Patent
Rahman et al.

(10) Patent No.: US 9,197,575 B2
(45) Date of Patent: Nov. 24, 2015

(54) HANDLING OF SNAPSHOT MESSAGES AS A RESULT OF DELIVERY FAILURE IN A TWO-WAY PUSH CONNECTION

(71) Applicant: Cellco Partnership, Basking Ridge, NJ (US)

(72) Inventors: S M Masudur Rahman, Edison, NJ (US); Zulfiqer Sekender, Edison, NJ (US); Sankar Shanmugam, Dayton, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 114 days.

(21) Appl. No.: 14/181,984

(22) Filed: Feb. 17, 2014

(65) Prior Publication Data

US 2015/0236970 A1    Aug. 20, 2015

(51) Int. Cl.
*G01R 31/08* (2006.01)
*H04L 12/863* (2013.01)
*H04L 12/26* (2006.01)

(52) U.S. Cl.
CPC ............ *H04L 47/54* (2013.01); *H04L 43/0847* (2013.01); *H04L 43/0829* (2013.01)

(58) Field of Classification Search
CPC ......... H04L 47/00; H04L 47/10; H04L 47/54; H04L 43/00; H04L 43/0823; H04L 43/0847; H04L 43/10
See application file for complete search history.

(56) References Cited

U.S. PATENT DOCUMENTS

| | | | |
|---|---|---|---|
| 7,418,635 B2 * | 8/2008 | Schulstad | 714/45 |
| 7,978,598 B1 * | 7/2011 | Majee | 370/225 |
| 2014/0043982 A1 * | 2/2014 | Bodog et al. | 370/242 |

OTHER PUBLICATIONS

U.S. Appl. No. 13/216,972 entitled "Enterprise Middleware Platform for a Push Notification Framework," filed Aug. 24, 2011, see e.g. pp. 16-17.

* cited by examiner

*Primary Examiner* — Anh Ngoc Nguyen

(57) ABSTRACT

A system allows for storage of failed push data intended for delivery to a mobile device through a mobile network via a persistent connection between the mobile device and a push engine. Delivery of the push data fails upon failure of the persistent connection. Upon failure of the persistent connection, failed push data corresponding to applications for which the mobile device is registered is stored in a database. Failed push data stored in the database is delivered when the persistent connection is reestablished.

20 Claims, 8 Drawing Sheets

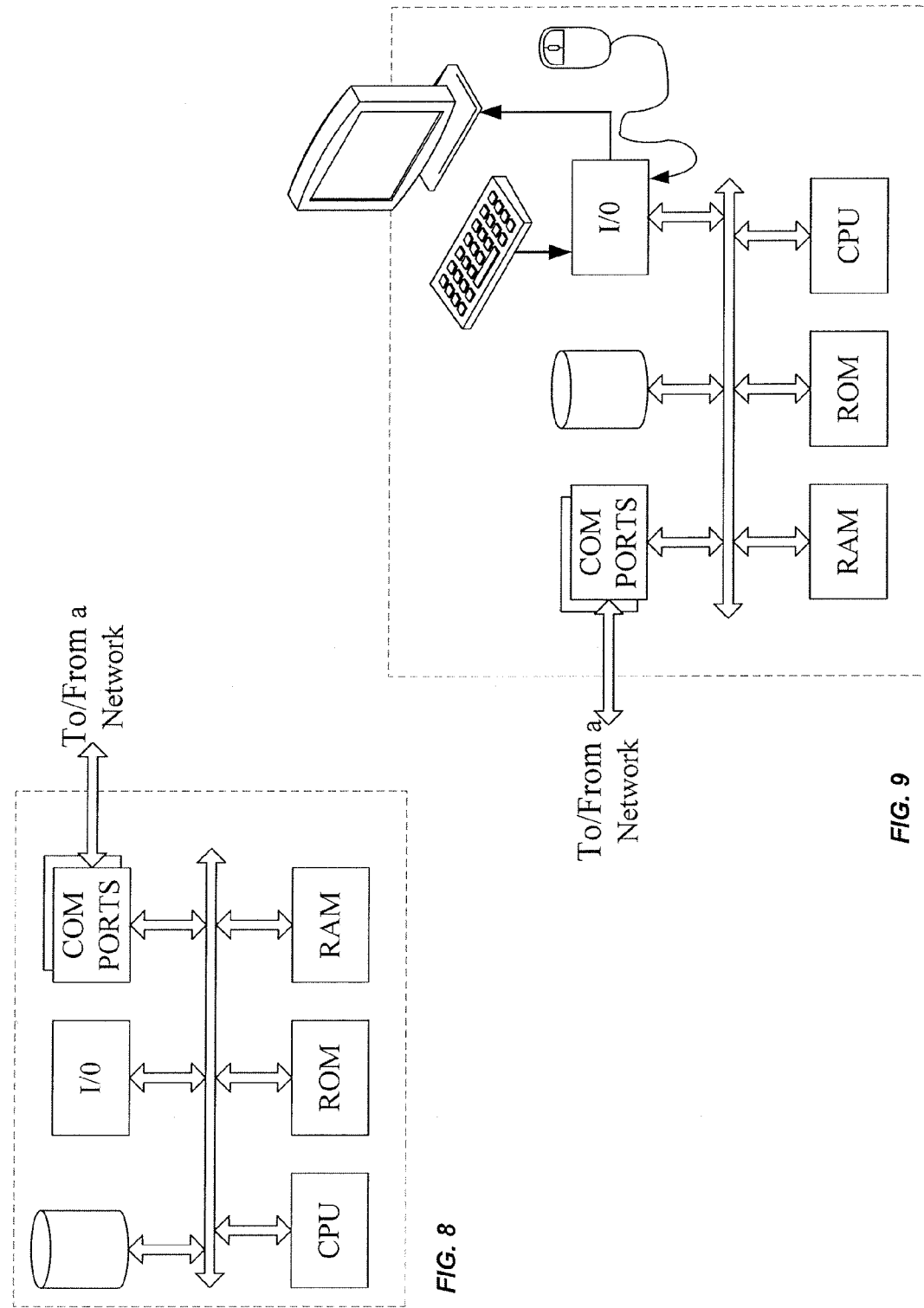

HANDLING OF SNAPSHOT MESSAGES AS A RESULT OF DELIVERY FAILURE IN A TWO-WAY PUSH CONNECTION

BACKGROUND

In recent years, mobile communication services have expanded and increased in popularity around the world. Many advanced networks offer various wireless mobile communication services for voice calls and data communications. The data communications services, for example, enable surfing the world wide web via a browser on a mobile device and receiving various data (including real-time data) from remote servers. Further, more and more applications on mobile devices require frequent updates of real-time data from various information servers, for example, to communicate various notification messages.

Many applications on mobile devices use existing polling and pulling techniques to obtain data periodically from remote servers. For example, a client device often "pulls" data by requesting data and receiving responsive data communications from a server. A mail client application running on a mobile device connects to a mail server frequently to check for new mails ("polling") and fetch data if new mail messages are present ("pulling"). However, the polling and pulling techniques have drawbacks, especially on mobile devices (e.g., unnecessary "polling" when no data is available and delayed "pulling" until next "polling" cycle when data is available). As an alternative, mobile devices may receive the various notification messages "pushed" to the mobile devices via a persistent connection maintained through a mobile network between the mobile devices and a push platform. Such "pushing" allows delivery of messages or other data to the mobile devices as data becomes available. Pushing, however, requires the persistent connection be maintained, which is not always possible. For example, a mobile device may be turned off or may have traveled out of range of the mobile network. In these situations, a user still wants to receive any message or other data that might have been delivered to the mobile device during the time period of interruption of the persistent connection.

Hence a need exists for handling messages in a push platform for which delivery failed due to lack of a persistent connection through a network between a mobile device and the network.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 8 is a simplified functional block diagram of a computer that may be configured as a host or server, as shown in the system of FIG. 1.

FIG. 9 is a simplified functional block diagram of a personal computer or other work station or terminal device.

DETAILED DESCRIPTION OF EXAMPLES

Figure 1:
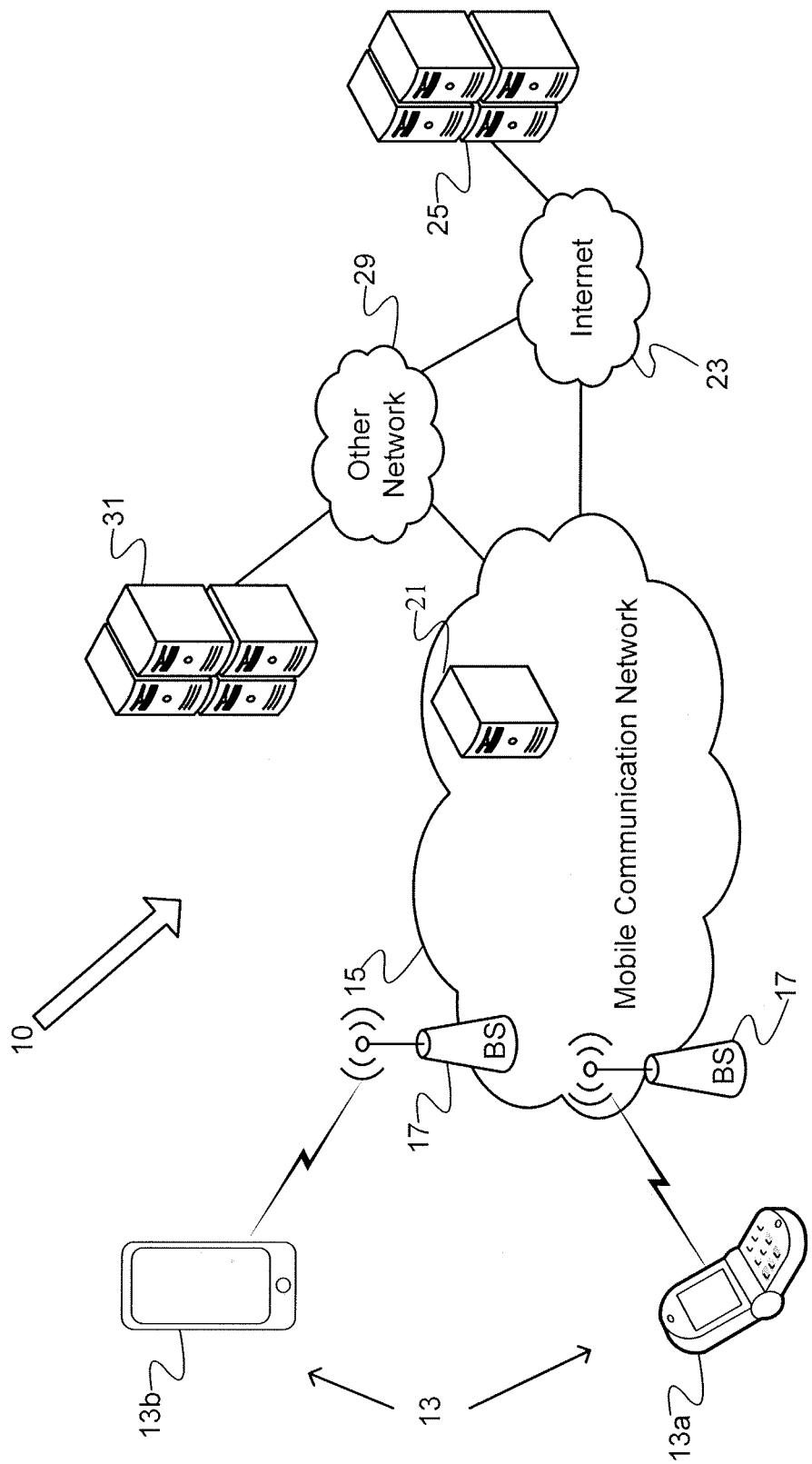
FIG. 1 is a high-level functional block diagram of a system of networks/devices that provide various communications for mobile devices and supports a technique of handling failed message delivery in a push platform.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

"Push technology" can be implemented to resolve, among other things, some of the problems that the polling and pulling techniques exhibit, e.g., to reduce battery drain, provide high availability and accuracy of real-time data. The push technology delivers information to a mobile device only when new information becomes available, and the delivery of the information is initiated by a server, e.g., an information server, on a network rather than a mobile device. That is, once a connection is established between the mobile device and a push engine on the network, data is "pushed" from the push engine to the mobile device as it becomes available in real or near-real time from the information server. The data communication between the mobile device and the push engine is maintained or kept active to allow a push of data as new information for the mobile device becomes available on the push engine from the information server, therefore the ongoing data session is sometimes called a "persistent connection." In this nomenclature, "connection" refers to a logical communication session through the network not necessarily a physical or electrical connection. Because the "connection" is persistent (i.e., the same logical connection is used for multiple communication messages), the mobile device does not need to repeatedly poll the network to determine if new data is available. Instead, the mobile device can simply wait for new information to be delivered by the push engine.

However, there are challenges in implementing the push technology, such as maintaining a persistent connection between a mobile device and a push engine on a network. For example, the mobile device may be turned off or in airplane mode, the mobile device may be passing through an area with limited or no signal, or the mobile device may be transitioning from a mobile communication network to a WiFi network. When the push engine fails to deliver a push message, either because the persistent connection is unavailable or as a unsuccessful attempt to actually deliver the push message over the persistent connection without acknowledgement of receipt (i.e., the mobile device has lost signal or otherwise been disconnected, but the persistent connection has not yet been terminated), the push engine may have the push message stored for later delivery. For example, a push controller or other component(s) of the push platform may determine that the mobile device is registered to receive the undelivered push message, in which case a snapshot (i.e., a copy of the push message) is delivered to a database for storage for later retrieval and delivery when the persistent connection is restored. The technologies disclosed below provide effective techniques to handle messages in a push platform for which delivery failed due to lack of a persistent connection through a network between a mobile device and the push platform at the time of a push attempt by the push engine, for example.

Reference now is made in detail to the examples illustrated in the accompanying drawings and discussed below. FIG. 1 illustrates a system 10 offering a variety of mobile communication services, including wireless communications for various data communications services, mobile messaging services, and voice and/or video telephone services for users of mobile devices 13. For the purposes of simplicity, the example illustrates only two mobile devices 13a and 13b and a mobile communication network 15. The mobile devices 13a and 13b are examples of mobile devices that may be used for various voice communications, data communications, and mobile messaging services. The mobile communication network 15 provides mobile wireless communications services to those mobile devices as well as to other mobile devices (not shown), for example, via a number of base stations (BSs) 17. The present techniques may be implemented in any of a variety of available mobile communication networks 15 and/ or so as to deliver pushed data to any type of mobile device 13 compatible with such a mobile communication network 15, and the drawing shows only a very simplified example of a few relevant elements of the network 15 for purposes of discussion here.

In the example, the mobile communication network 15 might be implemented as a network conforming to the code division multiple access (CDMA) IS-95 standard, the 3rd Generation Partnership Project 2 (3GPP2) wireless IP network standard, the Evolution Data Optimized (EVDO) standard, Long Term Evolution (LTE) standard, the Global System for Mobile (GSM) communication standard, a time division multiple access (TDMA) standard or other standards used for public mobile wireless communications.

Mobile devices 13 can take the form of portable handsets, smart-phones or personal digital assistants, tablet devices or the like, although they may be implemented in other form factors. The mobile devices 13 execute various stored mobile applications (or application programs) on the devices. Note that the terms "application(s)" and "application program(s)" are used synonymously herein. By way of example, the drawings depict the mobile device 13a as a "flip" open type feature phone with a keypad and display, and the mobile device 13b as a touchscreen type smartphone. An application running on a mobile device 13a or 13b may be configured to execute on many different types of the mobile devices. For example, a mobile device application can be written to execute on a binary runtime environment for mobile (BREW-based) mobile station, a Windows Mobile based mobile station, Android, iOS (for iPhone or iPad), Java Mobile, or RIM based mobile device such as a BlackBerry, or the like. Some of these types of devices can employ a multi-tasking operating system.

The mobile communication network 15 can be implemented by a number of interconnected networks. Hence, the mobile communication network 15 may include a number of radio access networks (RANs), as well as regional ground networks interconnecting a number of RANs and a wide area network (WAN) interconnecting the regional ground networks to core network elements. A regional portion of the network 15, such as that serving mobile devices 13, can include one or more RANs and a regional circuit and/or packet switched network and associated signaling network facilities.

Physical elements of a RAN operated by one of the mobile service providers or carriers, include a number of base stations represented in the example by the base stations (BSs) 17. Although not separately shown, such a base station 17 can include a base transceiver system (BTS), which can communicate via an antennae system at the site of base station and over the airlink with one or more of the mobile devices 13, when the mobile devices are within range. Each base station can include a BTS coupled to several antennae mounted on a radio tower within a coverage area often referred to as a "cell." The BTS is the part of the radio network that sends and receives RF signals to/from the mobile devices 13 that are served by the base station 17.

The radio access networks can also include a traffic or communication network represented generally by the cloud at 15, which carries the user communications and data for the mobile devices 13 between the base stations 17 and other elements with or through which the mobile stations communicate. The network can also include other elements that support functionality other than device-to-device media transfer services such as messaging service messages and voice communications. Specific elements of the network 15 for carrying the voice and data traffic and for controlling various aspects of the calls or sessions through the network 15 are omitted here form simplicity. It will be understood that the various network elements can communicate with each other and other aspects of the mobile communications network 15 and other networks (e.g., the public switched telephone network (PSTN) and the Internet) either directly or indirectly.

The mobile communication network 15 includes one or more push platforms 21 for real-time or near real-time data communications with the mobile devices 13. The term "near real-time" is used herein to describe the timeliness of data or information that has been delayed by the time required for electronic communication or data processing. In the descriptions herein "near real-time" implies that there are no significant delays (e.g., no delays exceeding a couple of minutes). A push platform 21 can be implemented in one or more servers and is capable of receiving real-time or near real-time data from a data source, such as an application server 25 or 31. Such real-time or near real-time data represents, for example, individual and/or distinct messages (e.g., e-mail or news notifications) for which the data source requests immediate delivery to the mobile device by the push platform, as opposed to streaming media for which the mobile device has requested delivery from the data source. The push platform 21 sends or pushes the received data to the mobile devices 13a and 13b over persistent connections in accord with disclosed techniques.

The carrier will also operate a number of systems that provide ancillary functions in support of the communications services and/or application services provided through the network 15, and those elements communicate with other nodes or elements of the network 15 via one or more private IP type packet data networks 29 (sometimes referred to as an Intranet), i.e., a private network. Generally, such systems are part of or connected for communication via the private network 29. It should be apparent, however, that systems outside of the private network could serve the same functions as well. Examples of such systems, in this case operated by the network service provider as part of the overall network 10, which communicate through the intranet type network 29, include one or more application servers 31 and 25.

The mobile devices 13 communicate over the air with a base station 17 and through the mobile communication network 15 for various voice and data communications, e.g., through the Internet 23 with a server 25 and/or with application servers 31. If a data service is provided to the mobile devices 13a and 13b, the data service may be hosted on a carrier or third party operated application server 31 (e.g., an information server, stock prices service server, etc.), for communication via the networks 15 and 29. The application server 31 can be a data source for providing real-time or near real-time data to the mobile devices 13. For example, the application server 31 (acting as an information server) can provide stock ticker update services and thus provide real-time or near real-time stock prices information in the form of notification messages to the mobile device 13a and 13b via the push platform 21 through the networks 29 and 15. In the example, a message containing data relating to received stock prices information can be pushed (or delivered) by the push platform 21 via one or more persistent connections to the mobile device 13a and 13b that has registered or subscribed to the real-time data service for stock prices over the mobile communication network 15.

Thus, in one example, application server 31 provides real-time or near real-time data to the push platform 21 and the push platform 21 pushes the real-time or near real-time data to mobile device 13a, 13b over a persistent connection 33 between push platform 21 and mobile device 13a, 13b. When mobile device 13a, 13b receives the pushed real-time or near real-time data, mobile device 13a, 13b provides an acknowledgement to the push platform 21 over the persistent connection 33. In this way, push platform 21 has confirmation that the pushed real-time or near real-time data was delivered to mobile device 13a, 13b.

Alternatively, the real-time data service can be provided by a separate, third party entity (alone or through agreements with the carrier), in which case, the service may be hosted on an application server, such as server 25 connected for communication via the networks 23 and 15. Servers such as 25 and 31 may provide any of a variety of common application or service functions in support of or in addition to an application program running on the mobile device 13a or 13b. However, for the purposes of discussion herein, we will focus on functions thereof in support of providing a real-time or near real-time data source that will utilize persistent connections to the mobile devices 13. For a given service, including the mobile data service, an application program within the mobile device may be considered as a 'client' and the programming at 25 or 31 may be considered as the 'server' application for the particular service.

The real-time or near real-time data under consideration herein may be delivered to touch screen type mobile devices as well as to non-touch type mobile devices. Hence, our simple example shows the mobile device 13a as a non-touch type mobile device and shows the mobile device 13b as a touch screen type mobile device. Implementation of the disclosed techniques will involve at least some execution of programming in the mobile devices 13.

In some situations, push platform 21 is unable to deliver the notification messages to mobile devices 13a and/or 13b. For example, mobile device 13a may be turned off or otherwise lack signal to mobile communication network 15, in which case a persistent connection between mobile device 13a and push platform 21 does not exist. In this example, the push platform 21 recognizes that a persistent connection does not exist, the push platform 21 determines that mobile device 13a is registered to receive the notification message, and, based on the registration determination, the push platform 21 stores a snapshot (i.e., a copy of the notification message) for later delivery to mobile device 13a when a persistent connection becomes available.

In a further example, a persistent connection is established between mobile device 13b and the push platform 21, as described above and further in relation to FIG. 2 below. Push platform 21, in this example, attempts to deliver a notification message over the persistent connection, but mobile device 13b fails to acknowledge receipt of the notification message. For example, mobile device 13b is turned off or otherwise loses signaling with the push platform 21 shortly before or during the attempted delivery such that the push platform 21 still considers the persistent connection valid despite persistent connection invalidity. In this example, when the push platform 21 fails to receive an acknowledgement from mobile device 13b, the push platform 21 determines that mobile device 13b is registered to receive the notification message and, based on the registration determination, the push platform 21 stores a snapshot (i.e., a copy of the notification message) for later delivery to mobile device 13b when a persistent connection is restored. When the same real-time or near real-time data is intended for multiple mobile devices 13a and 13b that are unreachable, the push platform 21 generates and stores a separate snapshot for each mobile device 13a, 13b that the push platform 21 determines is registered to receive the real-time or near real-time data.

Figure 2:
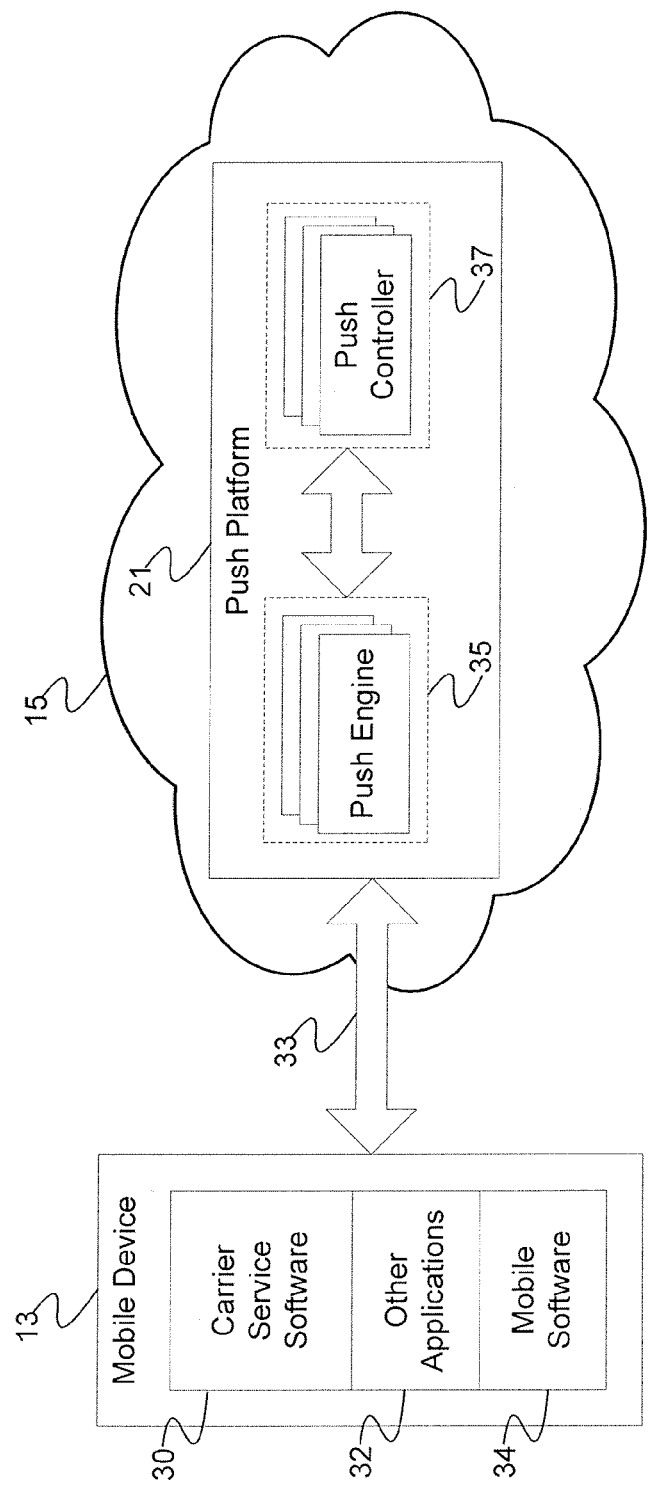
FIG. 2 is an illustration of architectural components employed in the push delivery techniques at a conceptual level.

FIG. 2 illustrates an architectural view of establishing a persistent connection, at a high level. At a conceptual level, the mobile device 13 (13a or 13b) includes carrier service software 30, other application programs 32, and mobile software 34. The carrier service software 30 is one or more carrier service programs, acting as a client, running on the mobile device 13 for at least establishing and maintaining persistent connections with a push platform 21 on the mobile communication network 15, and dispatching or routing received messages or real-time or near real-time data to other application programs 32 on the mobile device 13. The mobile device 13 also includes the other application programs 32 and mobile software 34 for various mobile communications functions in support of various services and functions, such as power management, connectivity management (such as WLAN, Bluetooth, WiFi, etc.), security, phone calls, text messages, mobile data, mobile messaging, location services, etc. Also, other mobile specific application software can be incorporated in the mobile software 34 in support of over-the-air (OTA) data sync, games, mobile radio and TV, etc.

Also shown is a wireless data connection 33 that is established between the mobile device 13 and the push platform 21 over the mobile communication network 15 of FIG. 1. The wireless data connection 33 over the mobile communication network 15 is termed as a "persistent connection" because the data communication between the mobile device 13 and push platform 21 is maintained or kept active to allow a push of data by the push platform 21 when needed. In other words, the persistent connection 33 is an ongoing communication session between two entities (or devices) 13 and 21. In this nomenclature, "connection" refers to a logical communication session through the packet network (not necessarily a physical or electrical connection).

The persistent connection 33 is established using a Hyper Text Transfer Protocol (HTTP) between the mobile station 13 and the push engine 35 of the push platform 21, which will be described in detail later. Also, it is appreciated that HTTP is an application layer protocol and requires a transport layer protocol (e.g., Transmission Control Protocol (TCP) or Internet Protocol (IP)) for device-to-device data transfer. The persistent connection 33 can be thought of as a dedicated data pipe for real-time or near real-time data exchange between the mobile device 13 and the push engine 35. As noted, in the example, the persistent connection 33 is a HTTP connection that uses the same packet connection to send and receive multiple HTTP requests and responses, as opposed to establishing a new connection for every single request and response pair. The persistent connection 33 thus enables the carrier service software 30 (or the mobile device 13) to receive real-time or near real-time data over the mobile communication network 15 from the push engine 35 or one or more application servers like 25 or 31. For example, the real-time or near real-time data is pushed to the mobile device 13 by the push engine 35 over the persistent connection 33, as the data becomes available.

As shown, the push platform 21 can include a plurality of push engines 35 and a plurality of push controllers 37. A push engine 35 can be a web server that holds and maintains millions of connections with different devices including mobile devices 13. The push engine 35 maintains the persistent connection 33 by regularly exchanging special messages called "heartbeat" messages with the mobile device 13 that has established the persistent connection 33 with the push engine 35. A heartbeat message is a short message sent to create network traffic over a long-lived network connection to keep end devices (and any intermediaries) from closing a stale connection and to indicate both ends of the connection are alive and still connected. The heartbeat messages can be sent to and/or from either the push engine 35 or mobile device 13 to keep the persistent connection 33 open or alive. When the push engine 35 fails to receive a heartbeat message from a mobile device 13 or the push engine 35 fails to receive an acknowledgement from a mobile device 13 in response to a heartbeat sent by the push engine 35, the push engine 35 determines that the persistent connection 33 is no longer valid and, therefore, unavailable. As described in greater detail below, the push engine 35 may also determine that the persistent connection 33 is no longer valid when the push engine 35 fails to receive an acknowledgement from a mobile device 13 in response to a push message sent by the push engine 35.

The push engines 35 communicate with the push controllers 37. A push controller 37 can be implemented in one or more servers equipped with capability to authenticate and/or validate authentication credentials of mobile devices 13 received through the push engines 35. The push controllers 37 also maintain states of persistent connections 33 between the mobile devices 13 and push engines 35. It should be appreciated that depending upon the specific implementation architecture, there could be one-to-one or one-to-many correspondence between the push controllers 37 and the push engines 35. For example, a plurality of push engines 35 can be mapped to a single push controller 37, each push engine 35 can be mapped to a different push controller 37, or a combination of the two may be present.

In the example, real-time or near real-time data can come from remote application servers like 25 or 31 (see FIG. 1). In such a case, the real-time or near real-time data is delivered to one or more push controllers 37 of the push platform 21 for delivery to a mobile device 13. The push controller 37 sends the received real-time or near real-time data to the push engine 35 that has established a persistent connection with the mobile device 13 that is to receive the real-time or near real-time data. The push engine 35 pushes the real-time or near real-time data over the persistent connection to the mobile device 13.

As noted earlier, a persistent connection is a logical communication session established between a mobile device and a push engine so that the mobile device can receive real-time or near real-time data from the push engine. This connection is established over a packet connection using various protocols, including TCP/IP, Secure Socket Layer (SSL), and HTTP protocols.

After a successful SSL handshake, the TCP/IP connection becomes a secure protocol packet connection for secure data transfer. In the example, the HTTP protocol is used to establish the secure protocol packet connection as a persistent connection between the mobile device 13 and push engine 35. For example, an HTTP "chunked" connection (e.g., data transfer encoding is set to a "chunked" encoding mode) over the secure protocol packet connection between the mobile device 13 and push engine 35 establishes the secure protocol packet connection as a persistent connection between the mobile device 13 and push engine 35. The "chunked" encoding is a specific data transfer encoding type and specifies that the message content is to be broken up into a number of "chunks", each of which is prefixed by its size in bytes. Thus, the "chunked" encoding is used when a large number of data is sent to a mobile device and the total size of the data cannot be known until it is fully processed. In the example, the "chunked" encoding allows HTTP messages to be broken up into several parts and enables transmission of a large amount of data to the mobile device 13 from the push engine 35 over the persistent connection 33.

Figure 3:
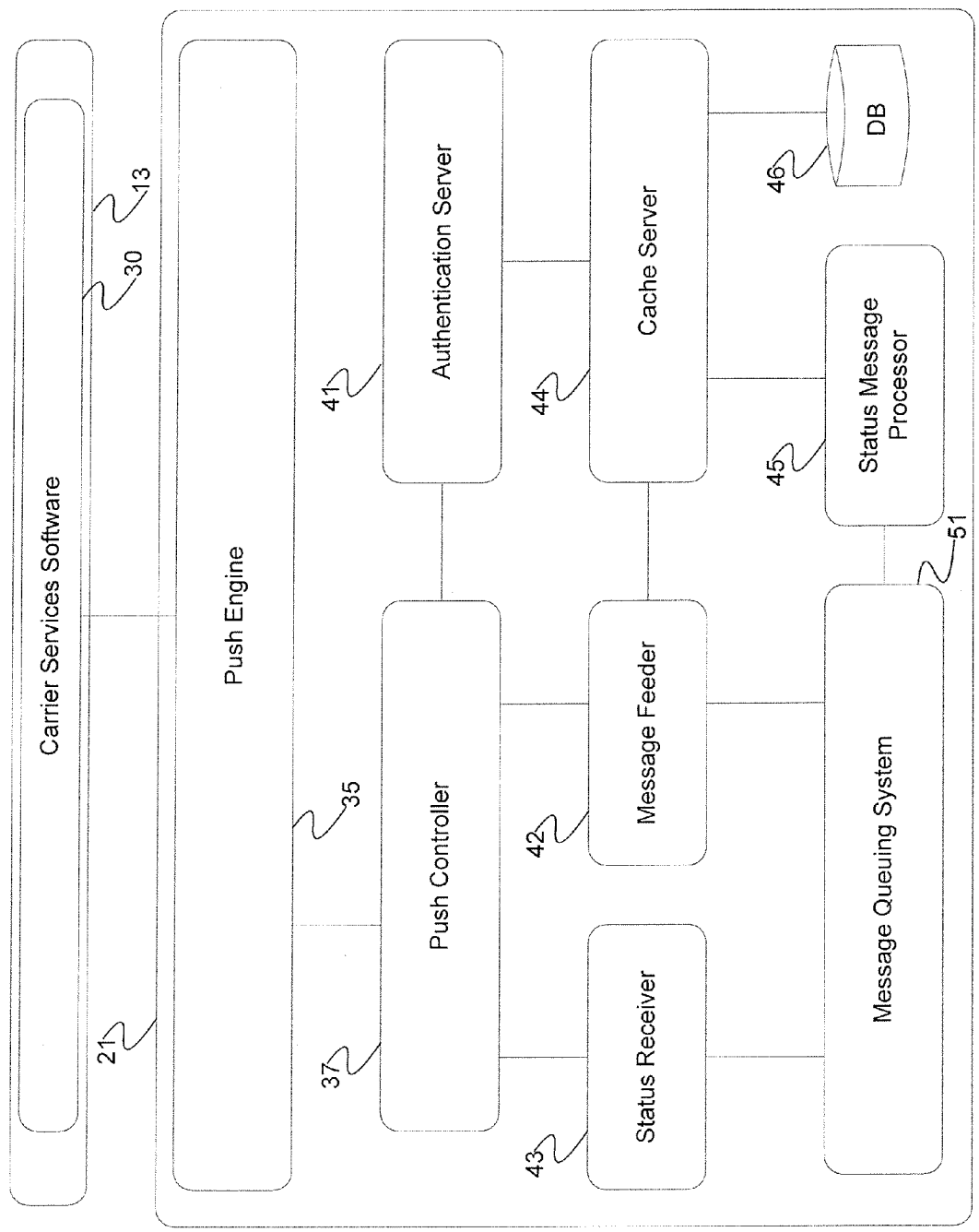
FIG. 3 is an illustration of architectural components employed in the disclosed techniques in greater detail.

FIG. 3 is an illustration of architectural components employed in the disclosed techniques in greater detail. As discussed above, the system serves a mobile device 13 with carrier services software 30 and a push platform 21. The push platform 21 includes one or more push engines 35 and one or more push controllers 37, as described above in relation to FIG. 2. In addition, the push platform 21 also includes, as described in greater detail below as well as in relation to FIGS. 4-7, an authentication server 41, a message feeder 42, a status receiver 43, a cache server 44, a status message processor 45, a database 46 and a message queuing system 51.

The authentication server 41 is responsible for authenticating mobile device 13 using given credentials. When a mobile device 13 initiates a persistent connection 33 with the push platform 21, mobile device 13 provides the necessary credentials for authentication. Such credentials are assigned by the carrier and include, for example, a mobile directory number (MDN), an International Mobile Subscriber Identity (IMSI) and an International Mobile Equipment Identifier (IMEI) corresponding to mobile device 13. The push platform 21 in turn provides the given credentials to the authentication server 41. The authentication server 41 validates the given credentials with a billing system (not shown) of the carrier to determine if the mobile device 13 is authorized to utilize the push platform 21. Once the authentication server 41 authenticates mobile device 13, the authentication server 41 generates a unique session identifier and the authentication server 41 sends the unique session identifier back to the mobile device 13 through push controller 37.

Message queuing system 51 holds real-time or near real-time data to be delivered to mobile devices 13, status messages related to the real-time or near real-time data, and other messages related to push platform 21. In an example, the message queuing system 51 includes four queues (not shown) corresponding to the real-time or near real-time data and other messages being held, as described in greater detail in relation to FIGS. 4-7 below. In this example, each of the four queues within the message queuing system 51 hold all of the messages of a particular type for push platform 21. For example, one queue holds the real-time or near real-time data for delivery to mobile devices 13 that the push platform 21 receives from application servers 25 or 31, as described in relation to FIG. 4. One queue holds confirmed snapshots (i.e., copies of real-time or near real-time data for which push controller 37 can determine whether mobile devices 13 are registered to receive) for which delivery failed, as described in the example of FIG. 5. One queue holds conditional snapshots (i.e., copies of real-time or near real-time data for which push controller 37 cannot determine whether mobile devices 13 are registered to receive) for which delivery failed, as described in the example of FIG. 6. In addition, one queue holds messages for exchange between components of the push platform 21, for example, a get snapshot request when a persistent connection 33 is restored, as described in relation to FIG. 7. Other message queuing arrangements may be used.

The message feeder 42 is responsible for reading the real-time or near real-time data from the message queuing system 51, determining whether mobile device 13 is registered to receive the real-time or near real-time data and forwarding the real-time or near real-time data to push controller 37 for delivery to mobile device 13 via push engine 35. As push engine 35 attempts to deliver the real-time or near real-time data to mobile device 13, push engine 35 generates a status message (i.e., success, failure with snapshot or failure with conditional snapshot) related to the real-time or near real-time data. Push engine 35 then passes the status message to push controller 37 for delivery to status receiver 43.

Status receiver 43 is responsible for receiving status messages from push controller 37, determining the type of status message (i.e., success, failure, get snapshot, etc.), and forwarding the status message to the appropriate queue (not shown) within message queuing system 51. Status message processor 45 is responsible for retrieving the status messages from the message queuing system and processing the status messages. As described in greater detail below in relation to FIGS. 5-7, the processing performed by status message processor 45 is based upon the type of status message and from which queue within message queuing system 51 status message processor 45 retrieves the status message.

Cache server 44 is utilized to cache database records, both on insertion and in anticipation of retrieval of one or more of the records, in order to improve performance and provide quicker access to database 46. Database 46 is utilized to store information related to the push platform 21, including information related to mobile device 13, snapshot messages, as described in greater detail below, and log information related to push platform 21.

Figure 4:
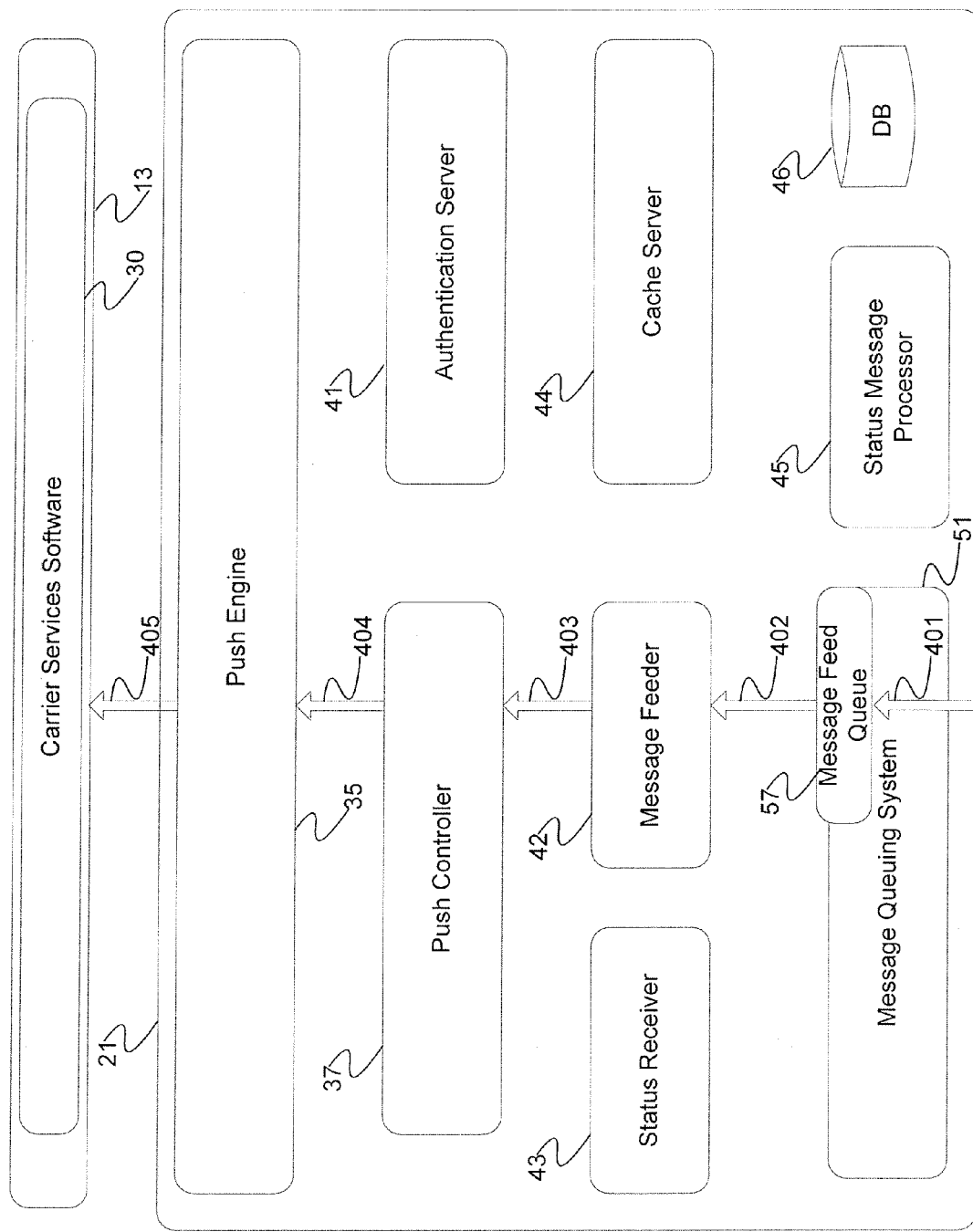
FIG. 4 is a flow diagram illustrating an example of a message flow in a push platform.

FIG. 4 shows the system components of FIG. 3 overlaid with arrows to form a flow diagram illustrating delivery of real-time or near real-time data in a push platform, as previously described above in relation to FIG. 2, in greater detail. In step 401, real-time or near real-time data is received by a message feed queue 57 within message queuing system 51 from a data source, such as application servers 25 or 31. In step 402, message feeder 42 retrieves the real-time or near real-time data from message feed queue 57 and message feeder 42 forwards the real-time or near real-time data to push controller 37 in step 403. As described above, push platform 21 may include multiple push controllers 37, in which case message feeder 42 selects one of the multiple push controllers 37 as part of step 403. Such selection is performed, for example, based on a determined capacity of each push controller 37, in a round-robin fashion (i.e., first message to first push controller, second message to second push controller, etc.), or randomly.

Push controller 37, in step 404, determines the appropriate push engine 35 to which the real-time or near real-time data should be forwarded. As described above, push platform 21 may include multiple push controllers 37 and/or multiple push engines 35. A persistent connection 33 for a mobile device 13, however, will only be established with a single push engine 35. Thus, push platform 21 maintains a record, in database 46 for example, of which push engine 35 holds the persistent connection 33 for mobile device 13. Such record is also cached, for example, in push controller 37. In a push platform 21 with multiple push controllers 37, such record is also cached, for example, in all of the push controllers 37. Therefore, in one example, push controller 37 searches the cache of push controller 37 based on mobile device identification information (e.g., MDN, IMSI, and/or IMEI) associated with the real-time or near real-time data to determine the appropriate push engine 35 and forwards the real-time or near real-time data to that push engine 35.

Push engine 35, in step 405, delivers the real-time or near real-time data to the carrier services software 30 of mobile device 13 over the persistent connection 33 (FIG. 2).

Figure 5:
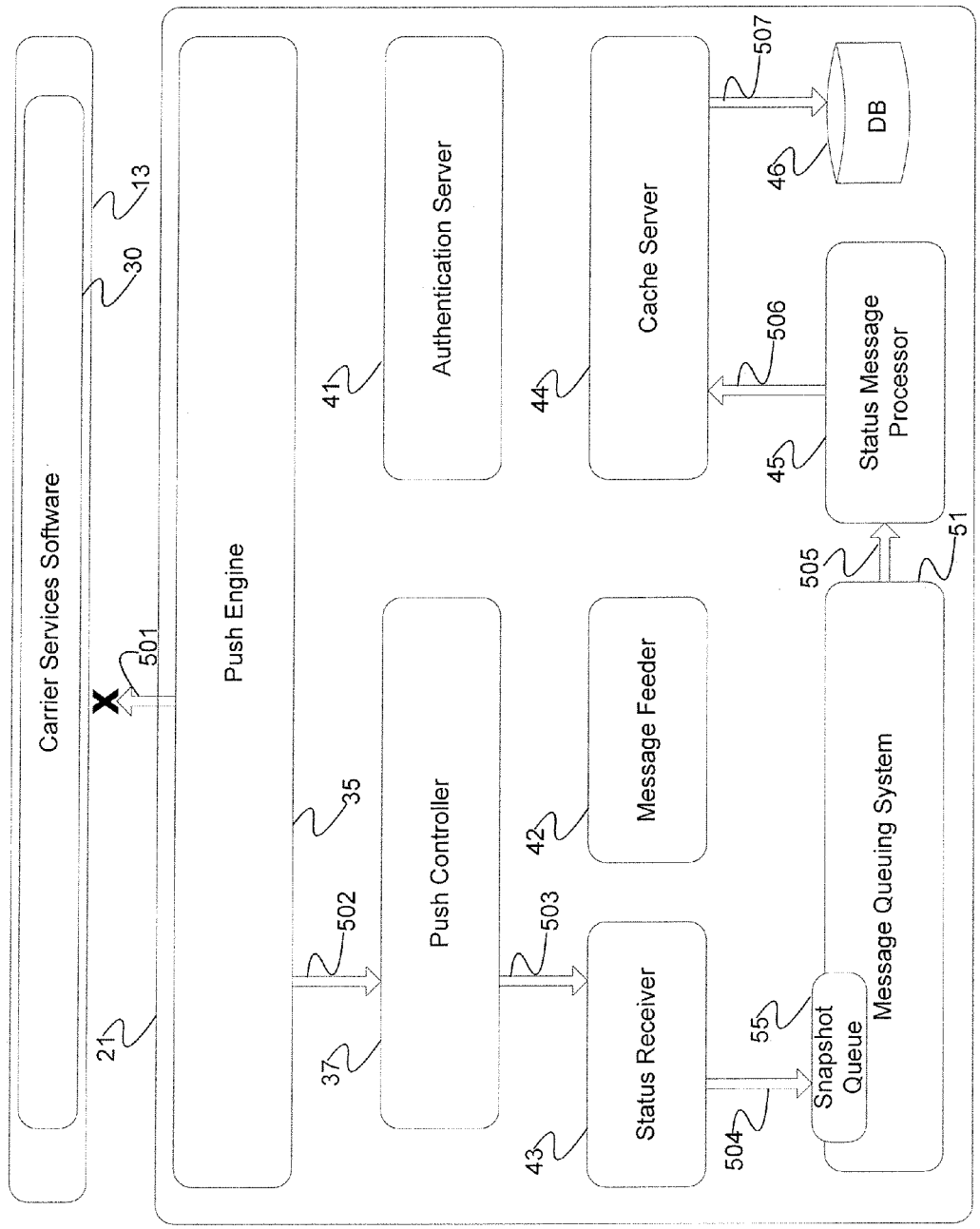
FIG. 5 is a flow diagram illustrating an example of a message flow for a failed message in a push platform.
Figure 6:
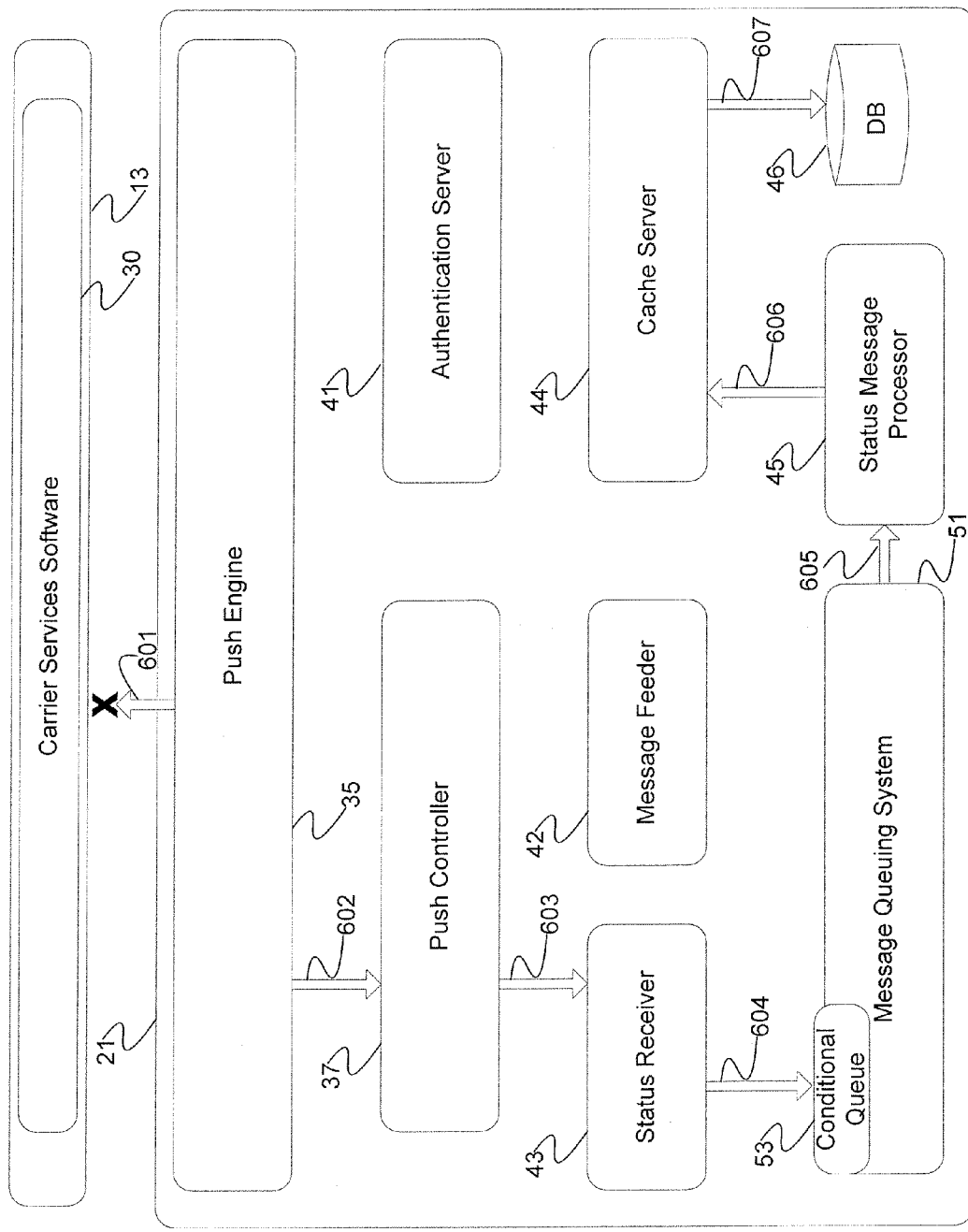
FIG. 6 is a flow diagram illustrating an example of an alternate message flow for a failed message in a push platform.
Figure 7:
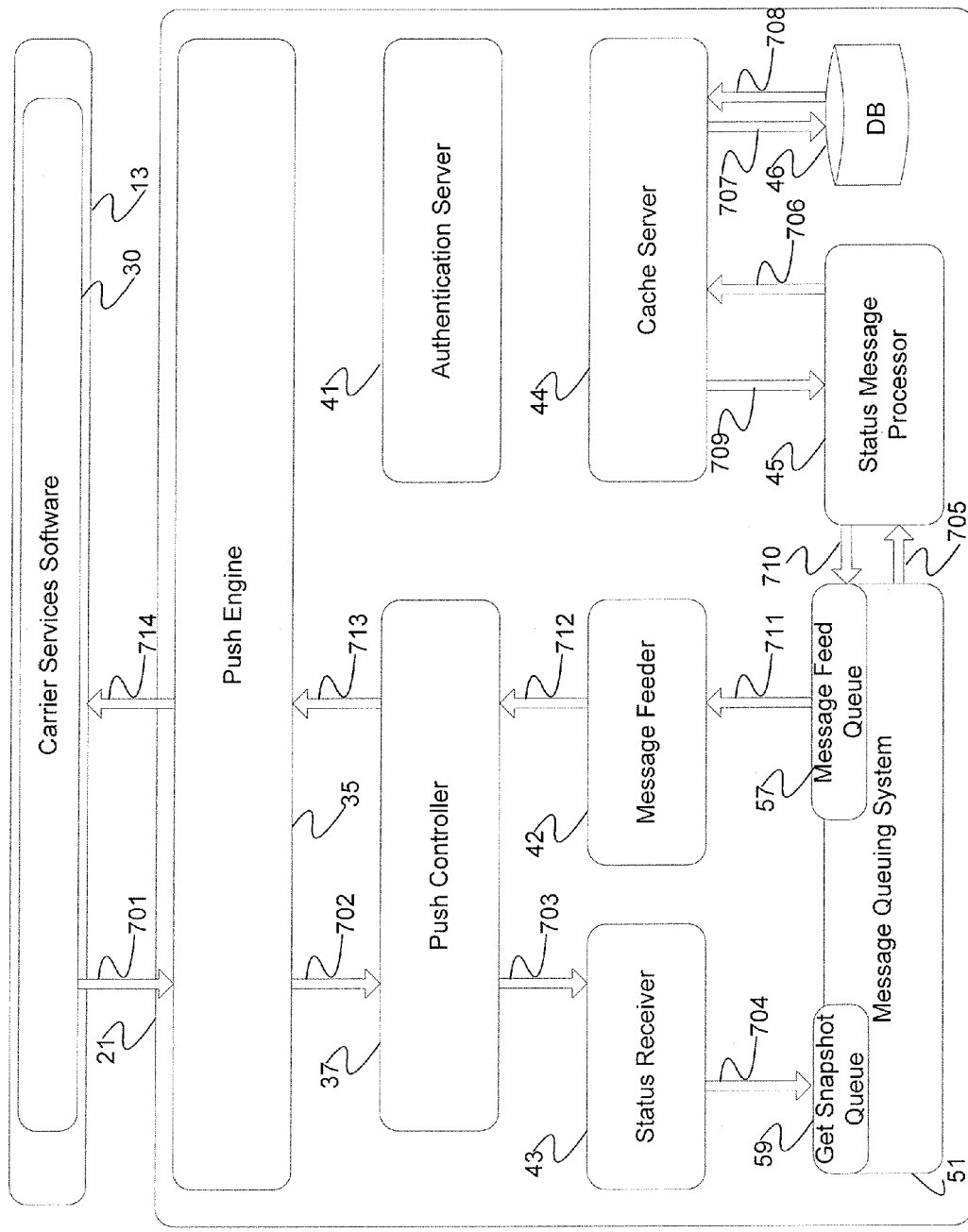
FIG. 7 is a flow diagram illustrating an example of a message flow upon reestablishment of a persistent connection between a mobile device and a push platform.

In some situations, persistent connection 33 between push engine 35 and mobile device 13 may not be available. For example, mobile device 13 is powered off or in airplane mode, the user of mobile device 13 is passing through an area with limited or no network availability, or the user of mobile device 13 is transitioning from mobile communications network 15 to a WiFi network (not shown), when the system has data intended for pushing to the mobile device 13. In these situations, however, the user of mobile device 13 may still desire the real-time or near real-time data to be delivered, albeit delayed, when the persistent connection 33 between mobile device 13 and push engine 35 is restored (e.g., mobile device 13 powered back on, regaining signal, or transitioning back to mobile communications network 15). FIGS. 5-6 illustrate alternative message flows through components of the system of FIG. 3 when the persistent connection 33 between push engine 35 and mobile device 13 is not available. FIG. 7 illustrates a message flow when the persistent connection between push engine 35 and mobile device 13 is restored.

In FIG. 5, push engine 35, as part of step 501, determines that the persistent connection 33 between push engine 35 and mobile device 13 is unavailable. As described above in relation to FIG. 2, push engine 35 utilizes heartbeat messages between push engine 35 and mobile device 13. In addition, push engine 35 may expect an acknowledgement sent from mobile device 13 in response to transmission of real-time or near real-time data to mobile device 13 from push engine 35. Failure to receive heartbeat messages and/or push acknowledgement messages, for example, can be used to determine if the persistent connection 33 is not available.

For example, each time push engine 35 sends real-time or near real-time data to mobile device 13, mobile device 13 responds with an acknowledgement, if mobile device 13 successfully receives the real-time or near real-time data. If, in this example, mobile device 13 does not successfully receive the real-time or near real-time data, push engine 35 would not receive the expected acknowledgement. A snapshot (i.e., a copy of the message) may be cached in database 46, as discussed in more detail below. The acknowledgement failure may also indicate that the persistent connection 33 is not available to handle further messages, and, as a result, snapshots of subsequent push data messages may also be cached. As another example, if push engine 35 fails to receive a heartbeat message, push engine 35 determines that the persistent connection 33 is not available, and, as a result, snapshots of subsequent push data messages may be cached.

Once push engine 35 determines the persistent connection 33 is not available, push engine 35 generates, in step 502, a snapshot (i.e., a copy of the real-time or near real-time data). As a further part of step 502, push engine 35 sends the snapshot message back to the push controller 37.

As part of step 503, push controller 37 determines whether push controller 37 contains registration status information corresponding to mobile device 13 and the snapshot message in the cache of push controller 37.

When push controller 37 authenticates mobile device 13, as described above in relation to FIGS. 2-3, push controller 37 receives registration status information for mobile device 13 (i.e., an application identifier corresponding to each application for which mobile device 13 is registered to receive real-time or near real-time data) and push controller 37 stores the received registration status information in the cache of push controller 37. Such registration status information is, for example, distinct from and in addition to any mapping information describing which push engine 35 holds a persistent connection 33 with mobile device 13. In a push platform 21 with a single push controller 37, for example, the push controller 37 will therefore contain all registration status information for all mobile devices 13 and all mapping information describing which push engine 35 holds a persistent connection 33 with mobile device 13. In a push platform 21 with multiple push controllers 37, however, each push controller 37 may contain all mapping information describing which push engine 35 holds a persistent connection 33 with which mobile device 13, but will only contain registration status information for those mobile devices 13 for which that push controller 37 performed authentication. In such a push platform 21 with multiple push controllers 37, message feeder 42, as described above, may forward any given real-time or near real-time data to any push controller 37. Thus, while each push controller 37 in such push platform 21 can forward the real-time or near real-time data to the appropriate push engine 35, that same push controller 37 may not be able to determine the registration status information for the corresponding snapshot message when the push engine 35 returns the snapshot message upon delivery failure. As such, push controller 37 performs the determination of step 503 by reviewing the cache of push controller 37 for any registration status information for mobile device 13.

In this example (FIG. 5), push controller 37 determines that the cache of push controller 37 contains registration status information for mobile device 13 and, therefore, push controller 37 can confirm mobile device 13 is registered to receive the real-time or near real-time data based on the stored registration status information. In the alternate example of FIG. 6, push controller 37 determines that the cache of push controller 37 does not contain registration status information for mobile device 13 and, therefore, push controller 37 cannot confirm whether mobile device 13 is registered to receive the real-time or near real-time data.

In the example of FIG. 5, the snapshot message is referred to as a snapshot message because it represents a snapshot of the real-time or near real-time data for which mobile device 13 is registered to receive. Push controller 37, as a further part of step 503, sends the snapshot message to status receiver 43. In step 504, status receiver sends the snapshot message to snapshot queue 55 within message queuing system 51. Status message processor 45, in step 505, retrieves the snapshot message from snapshot queue 55 within message queuing system 51 and, in step 506, delivers the snapshot message to cache server 44 for insertion into database 46 in step 507.

In FIG. 6, push engine 35, in step 601, determines that the persistent connection 33 between push engine 35 and mobile device 13 is not available. In step 602, push engine 35 generates a snapshot (i.e., a copy of the real-time or near real-time data) and sends the snapshot message to push controller 37. Thus, steps 501 and 502 in FIG. 5 and steps 601 and 602 in FIG. 6 are identical.

Similar to step 503 of FIG. 5, push controller 37, in step 603, determines whether the cache of push controller 37 contains registration status information for mobile device 13 and, therefore whether push controller 37 can confirm mobile device 13 is registered to receive the real-time or near real-time data. In this example, the cache of push controller 37 does not contain registration status information for mobile device 13 and, therefore, push controller 37 is unable to confirm that mobile device 13 is registered to receive the real-time or near real-time data. As part of step 603, push controller 37 adds a notation to the snapshot message that push controller 37 was not able to confirm whether mobile device 13 is registered to receive the real-time or near real-time data. This snapshot message is referred to as a conditional snapshot message because it represents a snapshot of the real-time or near real-time data for which push controller 37 was not able to confirm whether mobile device 13 is registered to receive. As a further part of step 603, push controller 37 sends the conditional snapshot message to status receiver 43. In step 604, status receiver 43 determines that the conditional snapshot message is conditional based on the notation added by push controller 37 and sends the conditional snapshot message to conditional queue 53 within message queuing system 51.

Status message processor 45, in step 605, retrieves the conditional snapshot message from conditional queue 55 within message queuing system 51. As a further part of step 605, status message processor 45 determines whether mobile device 13 is registered to receive the real-time or near real-time data by querying database 46, as described in greater detail below. Such determination is performed because status message processor 45 retrieved the conditional snapshot message from conditional queue 55 within message queuing system 51 and the conditional snapshot message contains the notation included by push controller 37 indicating inability of push controller 37 to determine if mobile device 13 is registered to receive the real-time or near real-time data.

Status message processor 45 determines whether mobile device 13 is registered to receive the real-time or near real-time data by querying (not shown) the database 46 via cache server 44. The query includes a request for any record contained in database 46 related to mobile device 13 and an application corresponding to the real-time or near real-time data. Such record would have been created when a persistent connection 33 was first established between mobile device 13 and push platform 21, as described above in relation to FIGS. 2-3, or at such other time as the user of mobile device 13 registers mobile device 13 for the real-time or near real-time data (e.g., user registers to receive notifications from a news site and the news site registers the user's mobile device 13 with the push platform 21). If mobile device 13 is registered to receive the real-time or near real-time data, database 46 will contain a record related to mobile device 13 and the application corresponding to the real-time or near real-time data, in which case database 46 will respond to the query from status message processor 45 with the record. If mobile device 13 is not registered to receive the real-time or near real-time data, database 46 will not contain a related record, in which case database 46 will not respond to the query from status message processor 45 or database 46 will respond with an error message or some other indication that database 46 does not contain a related record.

If status message processor 45 does not receive a response to the query or a response with an error message or some other indication that database 46 does not contain a related record, status message processor 45 determines that mobile device 13 is not registered to receive the real-time or near real-time data and discards the conditional snapshot message. If status message processor 45 does receive a response to the query with a related record, status message processor 45 determines that mobile device 13 is registered to receive the real-time or near real-time data and proceeds to step 606.

In step 606, status message processor 45 delivers the conditional snapshot message to cache server 44 for insertion into database 46 in step 607.

In FIG. 7, push engine 35, as part of step 701, determines that the persistent connection 33 between push engine 35 and mobile device 13 has been reestablished. For example, when mobile device 13 has been turned back on or otherwise regains connectivity with mobile communication network 15, mobile device 13 may initiate a new persistent connection 33 with push engine 35. Push engine 35, in step 702, generates a "get snapshot" message and sends the "get snapshot" message to push controller 37. The "get snapshot" message includes, for example, an identifier of mobile device 13 (i.e., mobile directory number) and an indication that the persistent connection 33 between push engine 35 and mobile device 13 has been reestablished.

Push controller 37 sends the "get snapshot" message, in step 703, to status receiver 43 and status receiver 43 sends the "get snapshot" message, in step 704, to a get snapshot queue 59 within message queuing system 51.

Status message processor 45, in step 705, retrieves the "get snapshot" message from get snapshot queue 59 within message queuing system 51. In step 706, status message processor 45 submits a database query for any snapshot messages corresponding to mobile device 13 previously stored in database 46 to cache server 44. The previously stored messages for that device include, for example, any snapshot message stored in accordance with the message flows of FIGS. 5-6. Cache server 44, in step 707, forwards the submitted database query to database 46; and database 46, in step 708, responds by sending any snapshot message(s) corresponding to mobile device 13 previously stored in database 46 to cache server 44. In step 709, cache server 44 forwards any snapshot messages received from database 46 to status message processor 45.

Status message processor 45, in step 710, submits any received snapshot messages corresponding to mobile device 13 to message feed queue 57 within message queuing system 51. Message feeder 42 retrieves, in step 711, any snapshot messages in message feed queue 57 within message queuing system 51 and, in step 712, forwards any retrieved snapshot messages to push controller 37. In step 713, push controller 37 forwards any snapshot messages to push engine 35. Push engine 35, in step 714, delivers any snapshot messages to mobile device 13 via persistent connection 33.

As described by way of example only, a push platform 21 stores snapshot messages as a result of delivery failure in a two-way push connection. A persistent connection 33 between a mobile device 13 and a push engine 35 is utilized to deliver real-time or near real-time messages by the push platform 21. When the push engine 35 is unable to deliver messages, either because the persistent connection 33 is unavailable or delivery via the persistent connection 33 fails, push engine 35 generates a snapshot, or copy, message and stores the snapshot in a database 46 for subsequent delivery when the persistent connection 33 is reestablished.

As shown by the discussion above, aspects of handling push messages as a result of failed delivery in a push communication system may be implemented on appropriately configured network connected computers or the like. A general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. files used for the user applications, and/or push client or push server applications. The software code is executable by the general-purpose computer that functions as the push server and/or that functions as a push client on a mobile device. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for handling failed messages in a push platform, in essentially the manner performed in the implementations discussed and illustrated herein.

FIGS. 8 and 9 provide functional block diagram illustrations of general purpose computer hardware platforms. FIG. 8 illustrates a network or host computer platform, as may typically be used to implement a server. FIG. 9 depicts a computer with user interface elements, as may be used to implement a personal computer or other type of work station or terminal device, although the computer of FIG. 9 may also act as a server if appropriately programmed. It is believed that the general structure and general operation of such equipment as shown in FIGS. 8 and 9 should be self-explanatory from the high-level illustrations.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load.

A computer type user terminal device, such as a PC or tablet computer, similarly includes a data communication interface CPU, main memory and one or more mass storage devices for storing user data and the various executable programs (see FIG. 9). A mobile device type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature.

Hence, aspects of the methods of handling failed messages in a push platform outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the service provider into the computer platform of the application server that will be the push server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the handling of failed messages in a push platform, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system comprising:
   a processor;
   a memory;
   a status receiver program in the memory;
   a status message processor program in the memory; and
   a message queuing system comprising a plurality of message queues, wherein:
      execution of the status receiver program by the processor configures the system to implement functions, including functions to:
         receive, from a push controller program, one or more snapshot messages for which delivery to a respective mobile device by a push engine program failed due to lack of a respective persistent connection established between the respective mobile device and the push engine program through a mobile network; and send each snapshot message to a selected one of the plurality of message queues within the message queuing system; and execution of the status message processor program by the processor configures the system to implement functions, including functions to:

retrieve, from the plurality of message queues within the message queuing system, each snapshot message; and process each snapshot message based at least in part on from which of the plurality of message queues each snapshot message was retrieved.

2. The system of claim 1, wherein the implemented function to send each snapshot message includes functions to:

for each snapshot message, determine whether the snapshot message comprises a notation;

in response to determining that the snapshot message comprises the notation, send the snapshot message to a conditional message queue; and in response to determining that the snapshot message does not comprise the notation, send the snapshot message to a snapshot message queue.

3. The system of claim 2, wherein the implemented function to process each snapshot message includes functions to:

in response to determining that the snapshot message was retrieved from the snapshot message queue, send the snapshot message to a cache server for storing in a database; and in response to determining that the snapshot message was retrieved from the conditional message queue, determine whether the respective mobile device is registered to receive the snapshot message.

4. The system of claim 3, wherein the implemented function to determine whether the respective mobile device is registered to receive the snapshot message includes functions to:

query, via the cache server, the database to determine whether a record corresponding to the respective mobile device and an application related to the snapshot message exists;

in response to determining that the record corresponding to the respective mobile device and the application related to the snapshot message exists, determine that the respective mobile device is registered to receive the snapshot message; and in response to determining that the record corresponding to the respective mobile device and the application related to the snapshot message does not exist, determine that the mobile device is not registered to receive the snapshot message.

5. The system of claim 4, wherein the implemented function to process each snapshot message further includes functions to:

in response to determining that the respective mobile device is registered to receive the snapshot message, send the snapshot message to the cache server for storing in the database; and in response to determining that the respective mobile device is not registered to receive the snapshot message, discard the snapshot message.

6. The system of claim 1, wherein execution of the status receiver program by the processor further configures the system to further implement functions, including functions to:

receive one or more "get snapshot" messages, from the push controller program and based upon reestablishing the respective persistent connection through the mobile network between the respective mobile device and the push engine program; and send each "get snapshot" message to a "get snapshot" message queue within the message queuing system to provide notification to the status message processor program of the reestablished persistent connection.

7. The system of claim 1, wherein execution of the status message processor program by the processor further configures the system to further implement functions, including functions to:

retrieve, from a "get snapshot" message queue within the message queuing system, one or more "get snapshot" messages corresponding to the respective mobile device upon reestablishing the respective persistent connection through the mobile network between the respective mobile device and the push engine program;

retrieve, from a database and via a cache server, any snapshot message corresponding to the respective mobile device previously stored in the database; and send any retrieved snapshot message corresponding to the respective mobile device for delivery to the corresponding respective mobile device by the push controller program via the push engine program.

8. A system comprising:

a processor;

a memory; and a status message processor program in the memory, execution of the status message processor program by the processor configuring the system to implement functions, including functions to:

retrieve, from a database, any snapshot message corresponding to a mobile device upon reestablishing a persistent connection through a mobile network between the mobile device and a push engine program, wherein any snapshot message retrieved from the database was previously stored in the database by the status message processor program as a result of delivery failure by the push engine program to the mobile device due to a lack of persistent connection between the mobile device and the push engine program; and send any retrieved snapshot message corresponding to the mobile device for delivery to the corresponding mobile device by a push controller program via the push engine program and the reestablished persistent connection through the mobile network.

9. The system of claim 8, further comprising:

a status receiver program in the memory, execution of the status receiver program by the processor configuring the system to implement functions, including functions to:

receive a "get snapshot" message, from the push controller program and based upon reestablishing the persistent connection between the mobile device and the push engine program; and send the get snapshot message to a get snapshot queue within a message queuing system, wherein execution of the status message processor program by the processor further configures the system to further implement functions, including functions to retrieve the get snapshot message from the get snapshot queue within the message queuing system.

10. A method, comprising:

receiving, by a status receiver and from a push controller, one or more snapshot messages for which delivery to a respective mobile device by a push engine failed due to lack of a respective persistent connection established through a mobile network between the respective mobile device and the push engine;

retrieving, by a status message processor, each snapshot message; and processing, by the status message processor, each snapshot message.

11. The method of claim 10, further comprising:

for each snapshot message, determining whether the snapshot message comprises a notation;

in response to determining that the snapshot message comprises the notation, sending the snapshot message to a conditional message queue within a message queuing system; and in response to determining that the snapshot message does not comprise the notation, sending the snapshot message to a snapshot message queue within the message queuing system.

12. The method of claim 10, wherein the status message processor retrieves each snapshot message from one of:

a conditional message queue within a message queuing system; or a snapshot message queue within the message queuing system.

13. The method of claim 12, further comprising:

in response to determining that the snapshot message was retrieved from the snapshot message queue, sending the snapshot message to a cache server for storing in a database; and in response to determining that the snapshot message was retrieved from the conditional message queue, determining whether the respective mobile device is registered to receive the snapshot message.

14. The method of claim 13, further comprising:

querying, via the cache server, the database to determine whether a record corresponding to the respective mobile device and an application related to the snapshot message exists;

in response to determining that the record corresponding to the respective mobile device and the application related to the snapshot message exists, determining that the mobile device is registered to receive the snapshot message; and in response to determining that the record corresponding to the respective mobile device and the application related to the snapshot message does not exist, determining that the respective mobile device is not registered to receive the snapshot message.

15. The method of claim 14, further comprising:

in response to determining that the respective mobile device is registered to receive the snapshot message, sending the snapshot message to the cache server for storing in the database; and in response to determining that the respective mobile device is not registered to receive the snapshot message, discarding the snapshot message.

16. The method of claim 10, further comprising:

receiving a get snapshot message, from the push controller and based upon reestablishing the respective persistent connection through the mobile network between the respective mobile device and the push engine;

sending the get snapshot message to a get snapshot message queue within a message queuing system to provide notification to the status message processor of the reestablished respective persistent connection;

retrieving, by the status message processor and from the get snapshot message queue within the message queuing system, the get snapshot message;

retrieving, by the status message processor and from the database via a cache server, any snapshot message corresponding to the respective mobile device previously stored in the database; and sending, by the status message processor and to a message feed queue within the message queuing system, any retrieved snapshot message corresponding to the respective mobile device.

17. The method of claim 16, further comprising:

retrieving, by a message feeder and from the message feed queue within the message queuing system, any snapshot message corresponding to the respective mobile device; and sending, by the message feeder and to the push controller, any retrieved snapshot message corresponding to the respective mobile device.

18. The method of claim 17, further comprising:

receiving, by the push controller and from the message feeder, any snapshot message corresponding to the respective mobile device; and sending, by the push controller and to the push engine, any received snapshot message corresponding to the respective mobile device.

19. The method of claim 18, further comprising:

receiving, by the respective push engine and from the push controller, any snapshot message corresponding to the respective mobile device; and sending, by the push engine and to the respective mobile device, any received snapshot message corresponding to the respective mobile device via the reestablished respective persistent connection.

20. An article of manufacture, comprising programming instructions for causing a processor of one or more computers to perform the method of claim 10 and a non-transitory machine-readable storage medium bearing the programming instructions.

* * * * *